US012566237B2

(12) United States Patent
Lindgren et al.

(10) Patent No.: US 12,566,237 B2
(45) Date of Patent: Mar. 3, 2026

(54) POSITION DETERMINATION OF A WIRELESS DEVICE

(71) Applicant: Telefonaktiebolaget LM Ericsson (PUBL), Stockholm (SE)

(72) Inventors: Tore Lindgren, Luleå (SE); Sara Sandberg, Luleå (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 366 days.

(21) Appl. No.: 18/245,732

(22) PCT Filed: Sep. 18, 2020

(86) PCT No.: PCT/SE2020/050874
§ 371 (c)(1),
(2) Date: Mar. 17, 2023

(87) PCT Pub. No.: WO2022/060265
PCT Pub. Date: Mar. 24, 2022

(65) Prior Publication Data
US 2023/0358850 A1 Nov. 9, 2023

(51) Int. Cl.
*G01S 5/02* (2010.01)
*G01S 3/46* (2006.01)
(Continued)

(52) U.S. Cl.
CPC ..................................... *G01S 5/04* (2013.01); *G01S 3/46* (2013.01); *G01S 3/48* (2013.01); *G01S 5/02213* (2020.05); *G01S 5/0278* (2013.01); *G01S 5/06* (2013.01)

(58) Field of Classification Search
CPC ...... G01S 5/04; G01S 5/02213; G01S 5/0278; G01S 5/06; G01S 3/48; G01S 3/46
(Continued)

(56) References Cited

U.S. PATENT DOCUMENTS 9,658,314 B2 * 5/2017 Parks ........................ G01S 3/46
11,550,017 B2 * 1/2023 Athley .................... G01S 3/325
(Continued)

FOREIGN PATENT DOCUMENTS

WO 2017 007527 A2 1/2017
WO 2017 007527 A3 1/2017
(Continued)

OTHER PUBLICATIONS

EPO Communication under Rule 71(3) EPC issued for Application No. 20 786 091.7-1206—Feb. 4, 2025.
(Continued)

*Primary Examiner* — Chuong P Nguyen
(74) *Attorney, Agent, or Firm* — Baker Botts L.L.P.

(57) ABSTRACT

There is provided mechanisms for position determination of a wireless device. A method is performed by a network node. The method comprises estimating a respective angle-of-arrival value for each of at least three 1D antenna arrays from measured phase differences between antenna elements per 1D antenna array for a signal communicated between the wireless device and the at least three 1D antenna arrays. The antenna elements of each 1D antenna array are arranged along a respective line. At least two of the lines are non-coincident with respect to each other. The method comprises determining the position of the wireless device by combining the angle-of-arrival values from the at least three 1D antenna arrays.

15 Claims, 6 Drawing Sheets

(51) Int. Cl.
    *G01S 3/48*         (2006.01)
    *G01S 5/04*         (2006.01)
    *G01S 5/06*         (2006.01)

(58) Field of Classification Search
    USPC .......................... 342/465, 450, 451, 463, 464
    See application file for complete search history.

(56) References Cited

U.S. PATENT DOCUMENTS

| | | | |
|---|---|---|---|
| 11,841,447 B2 * | 12/2023 | Nguyen | .................... G06N 3/09 |
| 12,072,427 B2 * | 8/2024 | Lavin | ................... H01Q 21/205 |
| 12,416,700 B2 * | 9/2025 | Tanaka | ................. G01S 7/4026 |
| 2013/0229310 A1 | 9/2013 | Parks et al. | |
| 2020/0200852 A1 * | 6/2020 | Lehtimaki | ............ H04B 1/7156 |

FOREIGN PATENT DOCUMENTS

| | | | | |
|---|---|---|---|---|
| WO | 2017 007527 A9 | 1/2017 | | |
| WO | WO-2018206098 A1 * | 11/2018 | .............. | G01S 3/48 |
| WO | WO-2021128153 A1 * | 7/2021 | ............. | G01S 3/043 |

OTHER PUBLICATIONS

PCT Notification of Transmittal of the International Search Report and the Written Opinion of the International Searching Authority, or the Declaration issued for International application No. PCT/SE2020/050874—Sep. 2, 2021.

* cited by examiner

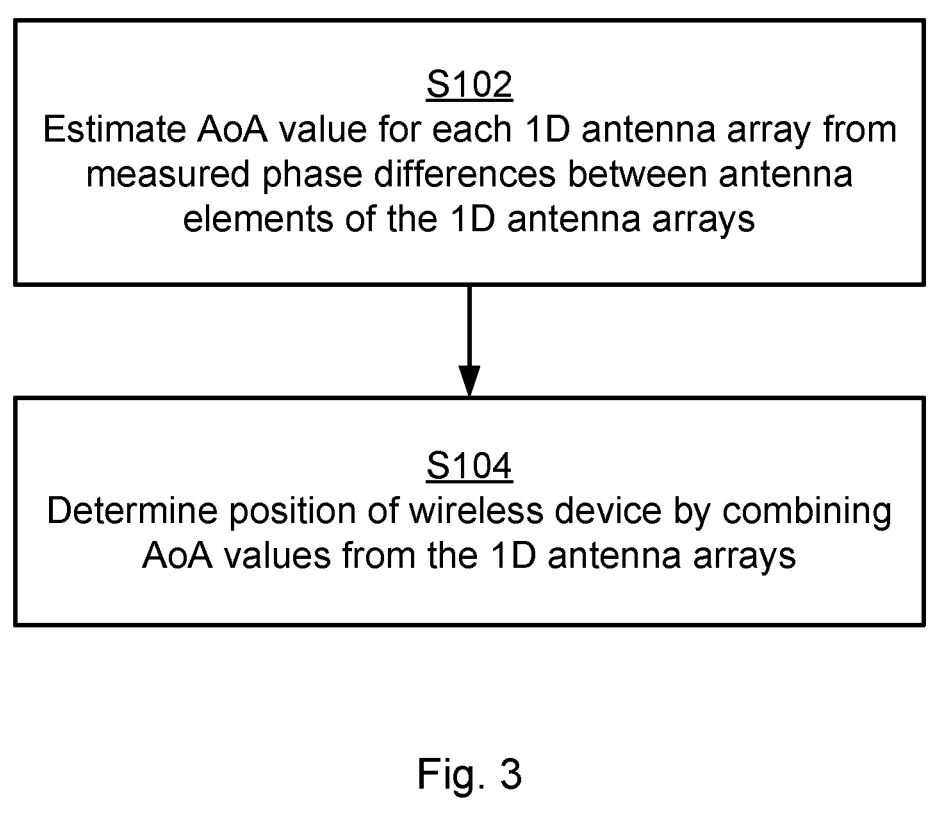

S102
Estimate AoA value for each 1D antenna array from measured phase differences between antenna elements of the 1D antenna arrays S104
Determine position of wireless device by combining AoA values from the 1D antenna arrays

Fig. 3

POSITION DETERMINATION OF A WIRELESS DEVICE

PRIORITY

This nonprovisional application is a U.S. National Stage Filing under 35 U.S.C. § 371 of International Patent Application Serial No. PCT/SE2020/050874 filed Sep. 18, 2020 and entitled "Position Determination of a Wireless Device" which is hereby incorporated by reference in its entirety.

TECHNICAL FIELD

Embodiments presented herein relate to a method, a network node, a computer program, and a computer program product for position determination of a wireless device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to correctly determine the position of wireless devices served by the communications network. As a non-limiting and illustrative example, positioning determination of wireless devices in indoor scenarios might utilize estimates of either the time of flight (ToF) measurements or angle-of-arrival (AoA) measurements of signals received at antenna arrays of network nodes from the wireless device in order to determine the position of the wireless device. One advantage of using angle-of-arrival measurements over ToF measurements is that there is no requirement on accurate time synchronization between the network nodes. Positioning methods based on angle-of-arrival measurements do thus not require network synchronization. Positioning methods based on angle-of-arrival measurements can therefore be used in scenarios where accurate network synchronization is difficult to achieve.

Using the angle-of-arrival measurements (both azimuth and elevation; thus requiring the use of a two-dimensional (2D) antenna array) from at least two antenna arrays, the location of the wireless device can be estimated using triangulation. An accurate estimate of the angle-of-arrival can be realized in the uplink provided that the amplitude and phase of an uplink signal, for example a sounding reference signal (SRS), is available for each antenna element or group of antenna elements, at the antenna array of the network node. At each network node, three channel measurements are needed from antenna elements in two directions.

The angle-of-arrival can be obtained by exploiting the fact that the phase difference of the received signal between two antenna elements in an antenna array is equal to the dot product of the vectors describing the relative position of the antenna elements and the unit vector pointing from the antenna array towards the wireless device. The angle-of-arrival can also be determined in the beam domain by taking the 2D Fourier transform of the amplitude and phase of the received signal at each antenna element. In case of multipath, multiple beams will be present and it is often possible (with the use of additional signal processing) to discriminate between the line-of-sight (LoS) beam and the multipath beams, assuming that a LOS beam exists. The accuracy of the angle-of-arrival estimate will depend primarily on the electrical size (expressed in terms of wavelength) of the antenna array and the number of antenna elements per antenna array.

One-dimensional (1D) antenna arrays are antenna arrays where all antenna elements are located along one and the same line. One example of a 1D antenna array is a uniform linear array (ULA). 1D antenna arrays are smaller and more cost effective than 2D antenna arrays. Positioning methods based on angle-of-arrival measurements require both azimuth and elevation angles. They will therefore not work in cases where 1D antenna arrays are used since the angle representing a rotation around the antenna array cannot be measured.

Hence, there is still a need for positioning methods where 1D antenna arrays are used.

SUMMARY

An object of embodiments herein is to enable positioning determination using 1D antenna arrays.

According to a first aspect there is presented method for position determination of a wireless device. The method is performed by a network node. The method comprises estimating a respective angle-of-arrival value for each of at least three 1D antenna arrays from measured phase differences between antenna elements per 1D antenna array for a signal communicated between the wireless device and the at least three 1D antenna arrays. The antenna elements of each 1D antenna array are arranged along a respective line. At least two of the lines are non-coincident with respect to each other. The method comprises determining the position of the wireless device by combining the angle-of-arrival values from the at least three 1D antenna arrays.

According to a second aspect there is presented a network node for position determination of a wireless device. The network node comprises processing circuitry. The processing circuitry is configured to cause the network node to estimate a respective angle-of-arrival value for each of at least three 1D antenna arrays from measured phase differences between antenna elements per 1D antenna array for a signal communicated between the wireless device and the at least three 1D antenna arrays. The antenna elements of each 1D antenna array are arranged along a respective line. At least two of the lines are non-coincident with respect to each other. The processing circuitry is configured to cause the network node to determine the position of the wireless device by combining the angle-of-arrival values from the at least three 1D antenna arrays.

According to a third aspect there is presented a network node for position determination of a wireless device. The network node comprises an estimate module configured to estimate a respective angle-of-arrival value for each of at least three 1D antenna arrays from measured phase differences between antenna elements per 1D antenna array for a signal communicated between the wireless device and the at least three 1D antenna arrays. The antenna elements of each 1D antenna array are arranged along a respective line. At least two of the lines are non-coincident with respect to each other. The network node comprises a determine module configured to determine the position of the wireless device by combining the angle-of-arrival values from the at least three 1D antenna arrays.

According to a fourth aspect there is presented a computer program for position determination of a wireless device, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable positioning determination using 1D antenna arrays.

Advantageously, in turn, this enables angle-of-arrival positioning methods to be implemented using simpler equipment, i.e., 1D antenna arrays, than in traditional angle-of-arrival based positioning methods, which are based on the use of 2D antenna arrays.

Advantageously, these aspects are applicable to any communications networks where angle-of-arrival measurements can be obtained using 1D antenna arrays, for example cellular communications networks (such as Long-Term Evolution (LTE) or New Radio (NR) based cellular communications networks), wireless local area networks (such as WiFi networks), ultra-wide band (UWB) cellular communications networks, Bluetooth networks, etc.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 3 is a flowchart of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for positioning methods where 1D antenna arrays are used.

The embodiments disclosed herein therefore relate to mechanisms for position determination of a wireless device. In order to obtain such mechanisms there is provided a network node, a method performed by the network node, a computer program product comprising code, for example in the form of a computer program, that when run on a network node, causes the network node to perform the method.

Figure 1:
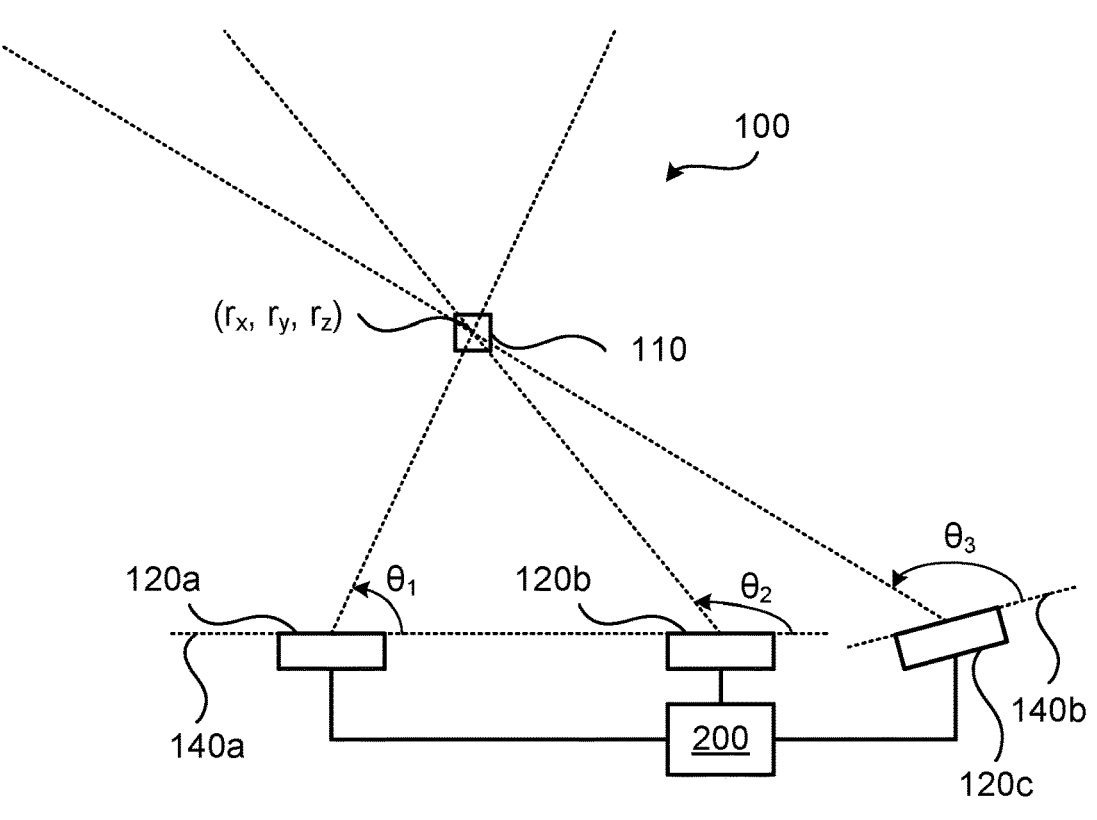
FIG. 1 is a schematic diagram illustrating a communications network according to embodiments.

FIG. 1 is a schematic diagram illustrating a communications network 100 where embodiments presented herein can be applied. The communications network 100 could be any of: a cellular communications network (such as Long-Term Evolution (LTE) or New Radio (NR) based cellular communications networks), a wireless local area network (such as WiFi networks), an ultra-wide band (UWB) cellular communications network, a Bluetooth network. The communications network 100 comprises a network node 200 operatively connected to three 1D antenna arrays 120a, 120b, 120c. The 1D antenna arrays 120a, 120b are placed on one and the same line 140a whereas the 1D antenna array 120c is placed on line 140b which thus does not coincide with line 140a. The network node 200 might be any of: a (radio) access network node, a radio base station, a base transceiver station, a node B (NB), an evolved node B (eNB), a gNB, or a dedicated positioning server. The 1D antenna arrays 120a, 120b, 120c are configured to provide network access to wireless devices, one of which is identified at reference numeral 110. The wireless device 110 might be any of: a portable wireless device, a mobile station, a mobile phone, a handset, a wireless local loop phone, a user equipment (UE), a smartphone, a wearable communication device, a laptop computer, a tablet computer, a wireless sensor, an Internet-of-Things (IoT) device, a network equipped vehicle. Wireless device 110 is assumed to, in an x, y, z-coordinate system, be located at a position $(r_x, r_y, r_z)$. According to embodiments disclosed herein, this position is to be determined by the network node 200 based on angle-of-arrival values $\theta_1$, $\theta_2$, $\theta_3$ of the 1D antenna arrays 120a, 120b, 120c, where $\theta_n$ is the angle-of-arrival value of the n:th 1D antenna array.

Figure 2:
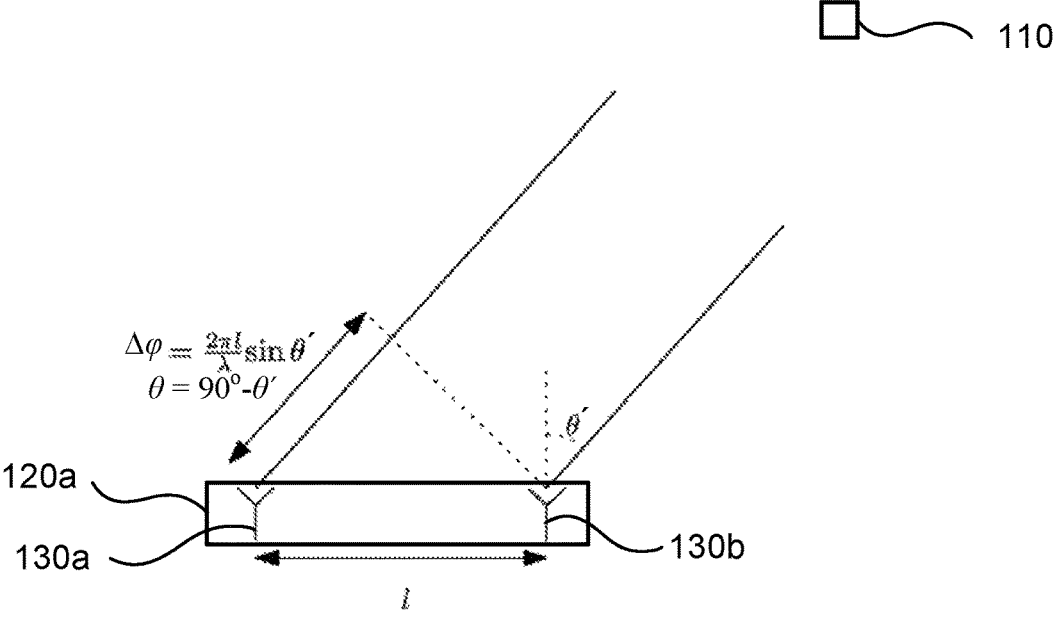
FIG. 2 schematically illustrates angle-of-arrival determination according to an embodiment.

FIG. 2 schematically illustrates how an angle-of-arrival value can be obtained at antenna array 120a having two antenna elements 130a, 130b. However, each of the antenna arrays 120a, 120b, 120c might have a plurality of antenna elements 130a, 130b. In this respect, in FIG. 2 is shown the calculation of the zenith angle $\theta'$, i.e., the angle to a surface perpendicular to the 1D antenna array 120a. The angle-of-arrival, $\theta$, as expressed in degrees can then be found as $\theta=90°-\theta'$. In this respect, $-90°\leq\theta'\leq+-90°$. Thus, if l is the distance between the two antenna elements 130a, 130b, and $\lambda$ is the wavelength of the incoming signal from wireless device 110, and $\Delta\varphi$ denotes the phase difference of the signal received by the two antenna elements 130a, 130b, then (expressed in radians):

$$\Delta\varphi = \frac{2\pi l}{\lambda}\sin\theta' = \frac{2\pi l}{\lambda}\sin\left(\frac{\pi}{2} - \theta\right)$$

from which θ can be solved.

FIG. 3 is a flowchart illustrating embodiments of methods for position determination of a wireless device 110. The methods are performed by the network node 200. The methods are advantageously provided as computer programs 1220.

The herein disclosed embodiments are based on estimating the angle-of-arrival for the 1D antenna arrays 120a, 120b, 120c, given the measured phase differences from the antenna elements in the 1D antenna arrays 120a, 120b, 120c. In particular, the network node 200 is configured to perform step S102:

> S102: The network node 200 estimates a respective angle-of-arrival value for each of at least three 1D antenna arrays 120a, 120b, 120c. The respective angle-of-arrival values are estimated from measured phase differences between antenna elements 130a, 130b per 1D antenna array 120a, 120b, 120c for a signal communicated between the wireless device 110 and the at least three 1D antenna arrays 120a, 120b, 120c. The antenna elements 130a, 130b of each 1D antenna array 120a, 120b, 120c are arranged along a respective line. At least two of the lines are non-coincident with respect to each other.

At each individual 1D antenna array 120a, 120b, 120c the phase of a signal communicated with the wireless device 110 is thus collected at all antenna elements 130a, 130b. The collected phase measurements are the relative phase differences between the antenna elements 130a, 130b within an antenna array 120a, 120b, 120c, as illustrated in FIG. 2.

Using angle-of-arrival estimates from at least three different 1D antenna array locations, the position of the wireless device 110 can be determined. Hence, the network node 200 is configured to perform step S104:

> S104: The network node 200 determines the position of the wireless device 110 by combining the angle-of-arrival values from the at least three 1D antenna arrays 120a, 120b, 120c.

This method thus enables the position of the wireless device 110 to be determined if the different 1D antenna arrays 120a, 120b, 120c used for the position estimation are placed on lines where at least two of the lines are non-coincident with respect to each other.

Embodiments relating to further details of position determination of a wireless device 110 as performed by the network node 200 will now be disclosed.

In some aspects, each angle-of-arrival estimate gives rise to a cone on which the position of the wireless device 110 is located. Such a cone will hereinafter be referred to as an angle-of-arrival-cone. In this respect, the angle-of-arrival cone for a given 1D antenna array can be defined using the orientation of that given 1D antenna array as the symmetry axis and the angle-of-arrival as half of the apex angle. Each of the estimated angle-of-arrival values might thus define a half-apex angle of a respective cone, where each cone has its apex centred at a respective one of the 1D antenna arrays 120a, 120b, 120c. In some embodiments, determining the position of the wireless device 110 in step S104 then equals identifying a position where all the cones intersect. Since the angle-of-arrival values define the half-apex angle of the cones, it is the lateral surfaces of the cones that intersect.

The angle-of-arrival cone can thus be defined using the orientation of the antenna array as symmetry axis and the angle-of-arrival as half of the apex angle. Hence, in some embodiments, the line along which the antenna elements 130a, 130b of one of the 1D antenna arrays 120a, 120b, 120c are arranged defines a symmetry axis for this one of the 1D antenna arrays 120a, 120b, 120c, and half of an apex angle of the symmetry axis defines the cone for this one of the 1D antenna arrays 120a, 120b, 120c.

Figure 4:
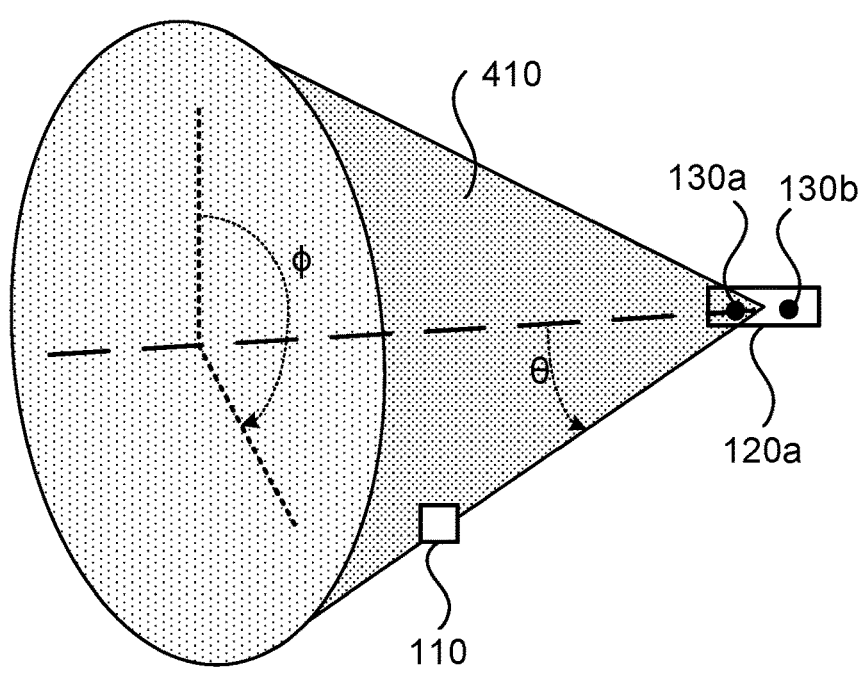
FIGS. 4, 5, 6, 7 schematically illustrate angle-of-arrival values appearing on cones according to embodiments.

The position of the wireless device 110 can be determined using the intersection of at least three angle-of-arrival cones, one for each of the 1D antenna arrays 120a, 120b, 120c. As illustrated in FIG. 4, this is equivalent to, for at least one of the 1D antenna arrays 120a, 120b, 120c, finding an unknown angle φ around the axis of rotation of the antenna array and the distance from the antenna array to the wireless device 110, given that the angle θ for this at least one of the 1D antenna arrays is already known. FIG. 4 schematically illustrates the angle-of-arrival cone 410 seen from an antenna array 120a comprising two antenna elements 130a, 130b. The angle-of-arrival cone 410 defines possible positions of the wireless device 110. The angle-of-arrival θ is calculated using the phase difference of the signal received by antenna elements 130a and 130b. φ is the unknown angle of rotation around the axis connecting the two antenna elements 130a and 130b. In this respect, in some embodiments, determining the position of the wireless device 110 in step S104 involves, for at least one of the 1D antenna arrays 120a, 120b, 120c, determining an angle φ around the symmetry axis and determining the distance between the wireless device 110 and this at least one of the 1D antenna arrays 120a, 120b, 120c.

Figure 5:
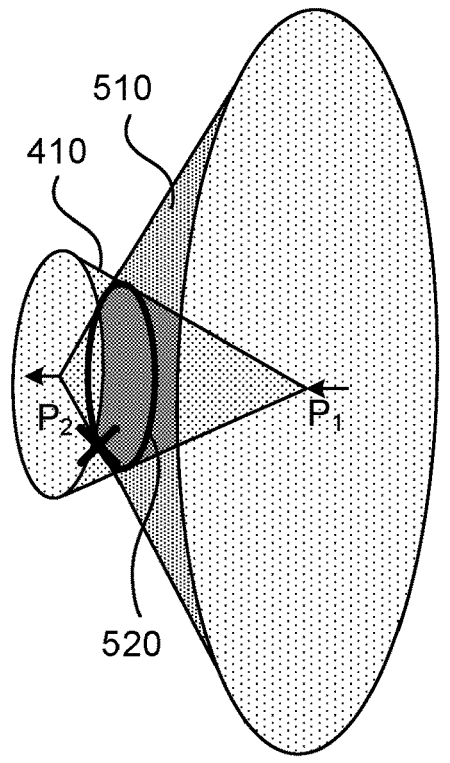

As illustrated in FIG. 5, the intersection of two angle-of-arrival cones 410, 510, one for a respective 1D antenna array, will give a circle, or ellipsis, 520 on which the wireless device 110 is located. In FIG. 5 the position and orientation of two 1D antenna arrays are shown with arrows P₁ and P₂ and the true position of the wireless device 110 is marked by a cross. All possible positions of the wireless device 110 are on the ellipsis 520 defined by the intersection of the two angle-of-arrival cones 410, 510. A third measurement is thus needed to determine where on the ellipsis the true position of the wireless device 110 can be found.

Figure 6:
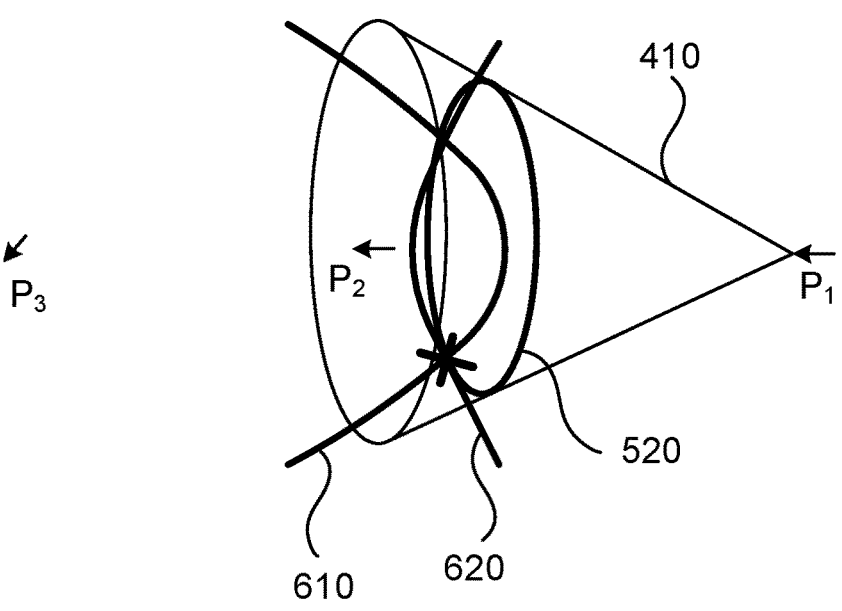

FIG. 6 illustrates, according to a first example, the intersection of three angle-of-arrival cones, one for each pair of 1D antenna arrays 120a, 120b, 120c, in terms of a lines, on which the position of the wireless device 110 is located. The position and orientation of each 1D antenna array are shown with arrows P₁, P₂ and P₃ in the figure and the true position of the wireless device 110 is marked by a cross. The orientation of the 1D antenna array at position P₃ is perpendicular to the 1D antenna arrays at positions P₁ and P₂. In FIG. 6 only the angle-of-arrival cone for the 1D antenna array located at position P₁ is shown to avoid cluttering. Ellipsis 520 marks the intersection between the angle-of-arrival cones for the 1D antenna arrays located at positions P₁ and P₂. Line 610 marks the intersection between the angle-of-arrival cones for the 1D antenna arrays located at positions P₁ and P₃. Line 620 marks the intersection between the angle-of-arrival cones for the 1D antenna arrays located at positions P₂ and P₃.

Figure 7:
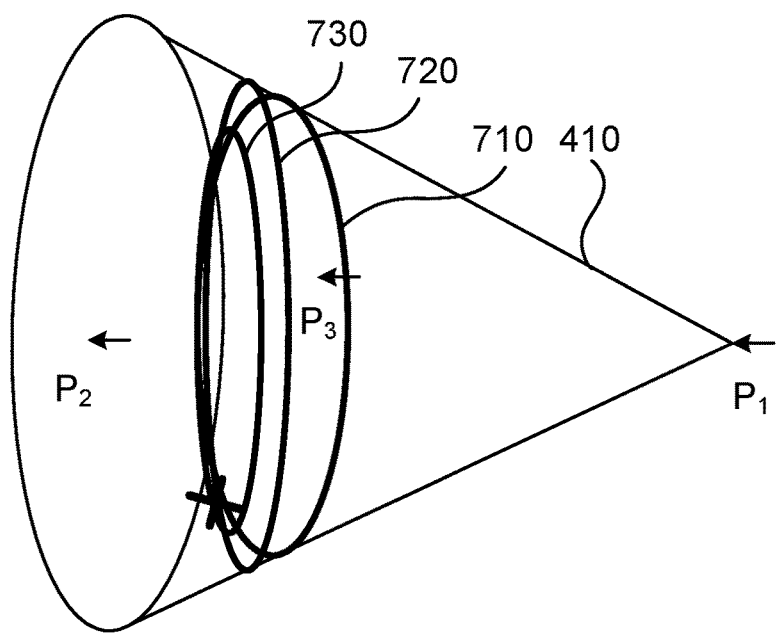

FIG. 7 illustrates, according to a second example, the intersection of three angle-of-arrival cones, one for each pair of 1D antenna arrays 120a, 120b, 120c, in terms of lines 610, 620, on which the position of the wireless device 110 is located. The position and orientation of each 1D antenna array are shown with arrows P₁, P₂ and P₃ in the figure and the true position of the wireless device 110 is marked by a cross. The 1D antenna arrays at positions P₁ and P₂ are on one and the same lines whereas the 1D antenna array at position P₃ is not on the same line as the 1D antenna arrays at positions P₁ and P₂. In FIG. 7 only the angle-of-arrival cone 410 for the 1D antenna array located at position P₁ is shown to avoid cluttering. Lines 710, 720, 730 marks the intersection between the angle-of-arrival cones for the 1D antenna arrays.

In general terms, for three 1D antenna arrays 120a, 120b, 120c, yielding three angle-of-arrival cones, two distinct possible positions of the wireless device 110 can be determined. That is, in some embodiments there are two positions at which all the cones intersect, and the position of the wireless device 110 is determined by selecting one of the two positions. One of the two possible positions might be highly improbable in a practical implementation and can thus be disregarded. In particular, each of the two positions might be associated with a respective probability value for being the position of the wireless device 110, and the position with highest probability value is selected. This could be the case where the 1D antenna arrays 120a, 120b, 120c are arranged to provide network access to wireless devices in a confined, or in other ways well-defined, region or space. One such example could be where the 1D antenna arrays 120a, 120b, 120c are arranged to provide network access to wireless devices in an indoor location and where the position of a wireless device corresponding to an outdoor location thus could be disregarded. Additional angle-of-arrival information from a fourth 1D antenna array may also be utilized to resolve this ambiguity.

In general terms, the problem of determining the position of a wireless device 110 using angle-of-arrival measurements from 1D antenna arrays 120a, 120b, 120c can be formulated as $$\frac{(r - p_n)}{|r - p_n|} \cdot \hat{p}_n = \cos\theta_n$$

Here, $r = (r_x, r_y, r_z)$ defines the position of the wireless device 110, $p_n$ is the position of the n:th 1D antenna array, $\hat{p}_n$ is the unit vector describing the orientation of the n:th 1D antenna array and $\theta_n$ is the angle-of-arrival measurement from the n:th 1D antenna array. This is a nonlinear system of equations (one for each value of n) which can be solved using a number of different approaches. Hence, in some embodiments, determining the position of the wireless device 110 in step S104 involves solving a nonlinear system of equations. Different ways in which the nonlinear system of equations can be solved will be disclosed next.

In some embodiments, the nonlinear system of equations is analytically solved.

Further in this respect, the system of equations might be reduced to a simpler problem which can be solved analytically. One example is when all three 1D antenna arrays are located on the x-axis in an x, y, z-coordinate system, where two of these 1D antenna arrays are also oriented along the x-axis whereas the third 1D antenna array is oriented along the y-axis. That is, in this example there are exactly three 1D antenna arrays 120a, 120b, 120c at positions $(x_1, 0, 0)$, $(x_2, 0, 0)$, and $(x_3, 0, 0)$ in an x, y, z-coordinate system, where the antenna elements 130a, 130b of the first and second of the 1D antenna arrays 120a, 120b, 120c are arranged along the x-axis and the antenna elements 130a, 130b of the third of the 1D antenna arrays 120a, 120b, 120c are arranged along the y-axis in this x, y, z-coordinate system. If the positions of the three antenna arrays are given by $(x_1, 0, 0)$, $(x_2, 0, 0)$, and $(x_3, 0, 0)$, respectively, and $\theta_1$, $\theta_2$ and $\theta_3$ are the estimated angle-of-arrival values of the three 1D antenna arrays, the position $(r_x, r_y, r_z)$ of the wireless device 110 is given by a nonlinear system of equations defined as:

$$r_x = \frac{x_2\tan\theta_2 - x_1\tan\theta_1}{\tan\theta_2 - \tan\theta_1},$$

$$r_y = \sqrt{(r_x - x_3)^2 + (r_x - x_1)^2\tan^2\theta_1}\,\cos^2\theta_3,$$

$$r_z = \pm\sqrt{(r_x - x_1)^2\tan^2\theta_1 - r_y^2}\,.$$

In some embodiments, the nonlinear system of equations is numerically and iteratively solved.

In this respect, the position of the wireless device 110 can be determined based on an initial guess of the position of the wireless device 110, and where the position is updated by calculating the direction and distance from one position guess to the next guess which minimizes the error of the position estimate.

In particular, in some embodiments, the position of the wireless device 110 is iteratively determined using gradient descent by, for each of the 1D antenna arrays 120a, 120b, 120c and for each current iteratively determined position of the wireless device 110, determining an angle error as difference between an angle-of-arrival value calculated for the current iteratively determined position and the estimated angle-of-arrival value. That is, for each 1D antenna array, based on an initial position estimate, the error $\Delta\theta_n$ of the angle-of-arrival value can be calculated as the difference between the measured angle $\theta_n$ and the angle corresponding to the current position estimate. The shortest vector which eliminates $\Delta\theta_n$ (that is, taking the shortest step to the surface of the cone corresponding to antenna array n) is then calculated. A new position estimate is calculated by adding these vectors corresponding to all the 1D antenna arrays to the previous position estimate. The process is then repeated until convergence is reached, or a fixed number of iterations have been made.

Figure 8:
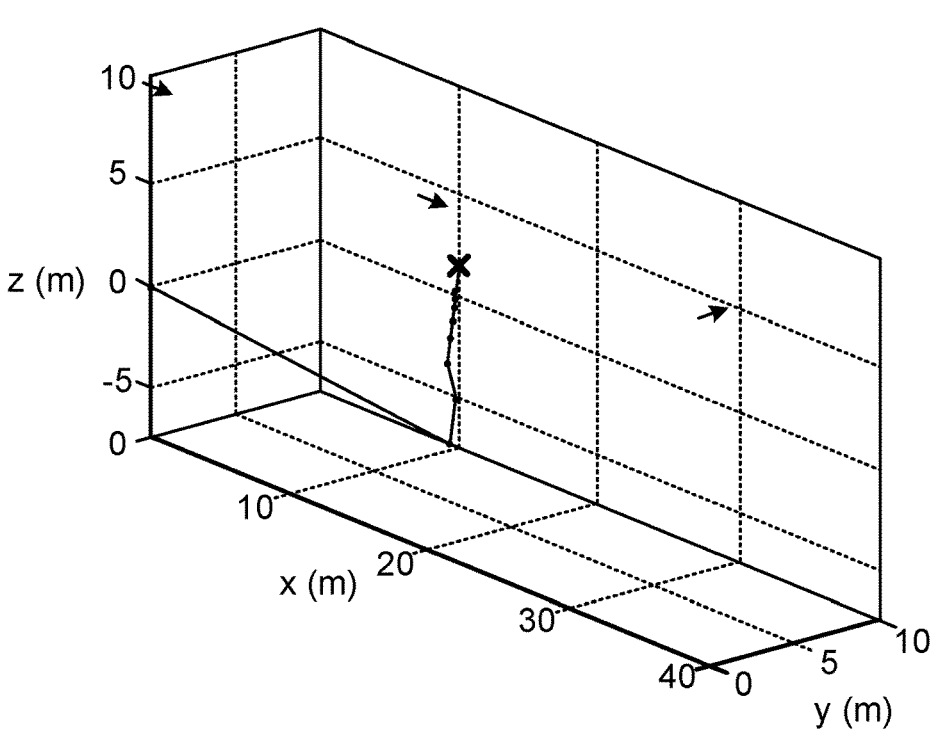
FIGS. 8, 9 schematically illustrate simulation results according to an embodiment.

FIG. 8 shows an example where the position of the wireless device 110 is iteratively determined using gradient descent. The position and orientation of the 1D antenna arrays are marked with arrows, the true position of the wireless device 110 is marked with a cross and the estimated position at each iteration is marked with dots (starting at the origin as the initial guess) connected by lines.

In some embodiments, the nonlinear system of equations is solved using brute force. For example, the nonlinear system of equations might be solved by testing a set of solutions, each corresponding to a respective position of the wireless device 110, and selecting one of the solutions according to a minimum error criterion. When using brute force, different possible positions of the wireless device 110 are tested and the one with the smallest error, according to some metric, is assumed to be the correct position. As a non-limiting illustrative example, the root mean square of the angle errors can be used as metric. The angle error is the difference between the (theoretical) angle $\theta$, that would have been observed by the 1D antenna arrays if the wireless device 110 had been located in the tested positions and the estimated angle at the different 1D antenna arrays. That is, in some embodiments, each respective position of the wireless device 110 yields a calculated angle-of-arrival value for each of the at least three 1D antenna arrays 120a, 120b, 120c, and the minimum error criterion pertains to a difference between the calculated angle-of-arrival values and the estimated angle-of-arrival values.

Figure 9:
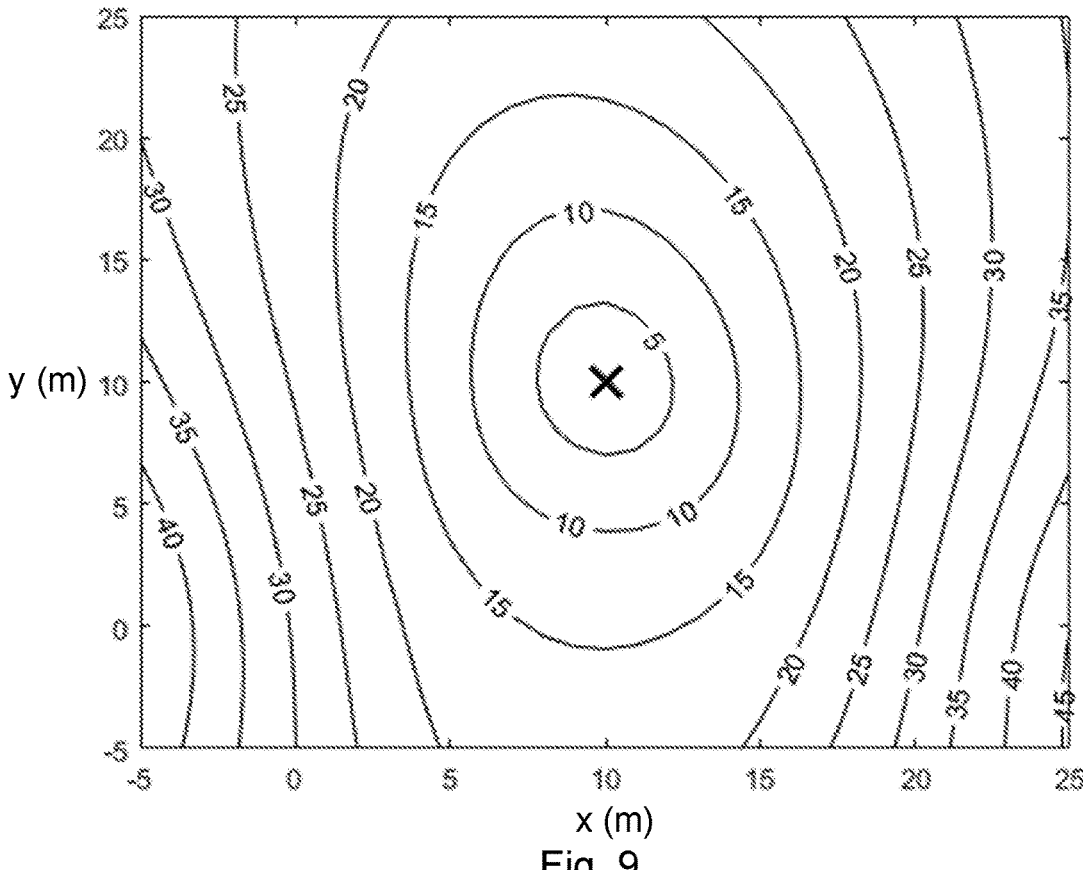

FIG. 9 illustrates, as a contour plot, an example of the root mean square of the angle errors for different tested positions of the wireless device 110 and where the true position of the wireless device 110 is marked with a cross. The numbers on each height curve in the contour plot correspond to the root mean square of the angle errors to three antenna arrays in degrees. The result in FIG. 9 assumes knowledge of the height of the wireless device. If the height is not known, the brute force process can be repeated for different values of the height.

Figure 10:
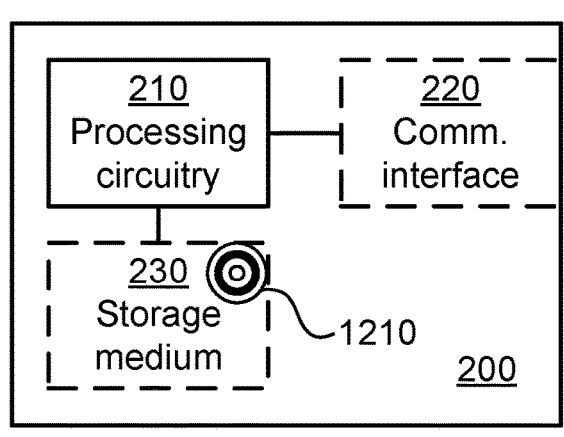
FIG. 10 is a schematic diagram showing functional units of a network node according to an embodiment.

FIG. 10 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices of the communications network 100, such as the 1D antenna arrays 120*a*, 120*b*, 120*c*. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 11:
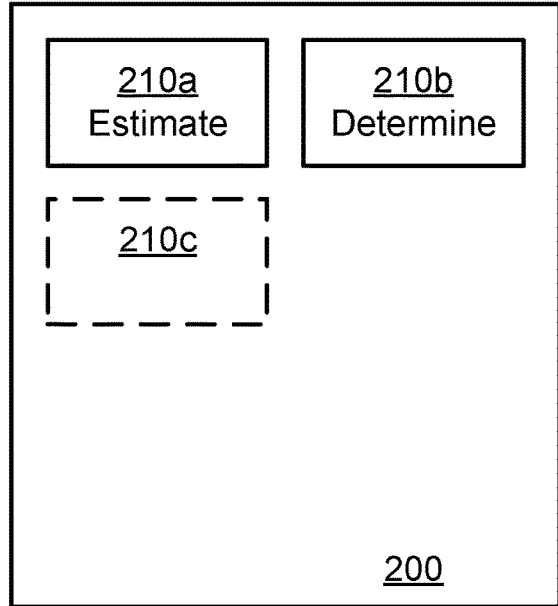
FIG. 11 is a schematic diagram showing functional modules of a network node according to an embodiment.

FIG. 11 schematically illustrates, in terms of a number of functional modules, the components of a network node 200 according to an embodiment. The network node 200 of FIG. 11 comprises a number of functional modules; an estimate module 210*a* configured to perform step S102, and a determine module 210*b* configured to perform step S104. The network node 200 of FIG. 11 may further comprise a number of optional functional modules, such as represented by functional module 210*c*. In general terms, each functional module 210*a*-210*c* may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 11. It should also be mentioned that even though the modules correspond to parts of a computer program, they do not need to be separate modules therein, but the way in which they are implemented in software is dependent on the programming language used. Preferably, one or more or all functional modules 210*a*-210*c* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*c* and to execute these instructions, thereby performing any steps as disclosed herein.

In some examples, the network node 200 is collocated with at least one of the 1D antenna arrays 120*a*, 120*b*, 120*c*. In some examples, at least one of the 1D antenna arrays 120*a*, 120*b*, 120*c* is collocated with another network node, and the measured phase difference for this at least one of the 1D antenna arrays 120*a*, 120*b*, 120*c* is obtained from this another network node. In some examples, the network node 200 is implemented in, or acts as, a positioning server.

Further, the network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 10 the processing circuitry 210 may be distributed among a plurality of devices, or nodes. The same applies to the functional modules 210*a*-210*c* of FIG. 11 and the computer program 1220 of FIG. 12.

Figure 12:
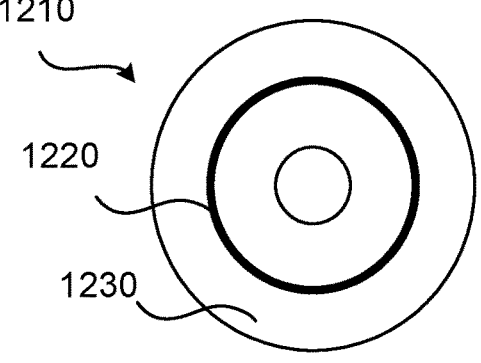
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for position determination of a wireless device, the method being performed by a network node, the method comprising:

estimating a respective angle-of-arrival value for each of three 1D antenna arrays at positions $(x\_1, 0, 0)$, $(x\_2, 0, 0)$, and $(x\_3, 0, 0)$ in an $(x, y, z)$-coordinate system, from measured phase differences between antenna elements per 1D antenna array for a signal communicated between the wireless device and the three 1D antenna arrays, wherein the antenna elements of a first and a second of the 1D antenna arrays are arranged along the x-axis and the antenna elements of a third of the 1D antenna arrays are arranged along the y-axis in said $(x, y, z)$-coordinate system; and determining the position of the wireless device by combining the angle-of-arrival values from the three 1D antenna arrays and where in the determining involves the solving of a nonlinear system of equations defined as:

$$r_x = \frac{x_2 \tan\theta_2 - x_1 \tan\theta_1}{\tan\theta_2 - \tan\theta_1},$$
$$r_y = \sqrt{(r_x - x_3)^2 + (r_x - x_1)^2 \tan^2\theta_1} \cos^2\theta_3,$$
$$r_z = \pm\sqrt{(r_x - x_1)^2 \tan^2\theta_1 - r_y^2},$$

wherein $(r_x, r_y, r_z)$ is the position of the wireless device, and $\theta_1$, $\theta_2$ and $\theta_3$ are the estimated angle-of-arrival values of the three 1D antenna arrays; and wherein the network node is collocated with at least one of the 1D antenna array.

2. The method according to claim 1, wherein each of the estimated angle-of-arrival values defines a half-apex angle of a respective cone, where each cone has its apex centred at a respective one of the 1D antenna arrays, and wherein determining the position of the wireless device equals identifying a position where all the cones intersect.

3. The method according to claim 2, wherein the line along which the antenna elements of one of the 1D antenna arrays are arranged defines a symmetry axis for said one of the 1D antenna arrays, and wherein half of an apex angle of the symmetry axis defines the cone for said one of the 1D antenna arrays.

4. The method according to claim 3, wherein determining the position of the wireless device involves, for at least one of the 1D antenna arrays, determining an angle around the symmetry axis and determining a distance between the wireless device and said at least one of the 1D antenna arrays.

5. The method according to claim 2, wherein there are two positions at which all the cones intersect, and wherein the position of the wireless device is determined by selecting one of the two positions.

6. The method according to claim 5, wherein each of the two positions is associated with a respective probability value for being the position of the wireless device, and wherein the position with highest probability value is selected.

7. The method according to claim 1, wherein at least one of the 1D antenna arrays is collocated with another network node, and wherein the measured phase difference for said at least one of the 1D antenna arrays is obtained from said another network node.

8. A network node for position determination of a wireless device, the network node comprising processing circuitry, the processing circuitry being configured to cause the network node to:

estimate a respective angle-of-arrival value for each of three 1D antenna arrays at positions $(x\_1, 0, 0)$, $(x\_2, 0, 0)$, and $(x\_3, 0, 0)$ in an $(x, y, z)$-coordinate system, from measured phase differences between antenna elements per 1D antenna array for a signal communicated between the wireless device and the three 1D antenna arrays, wherein the antenna elements of a first and a second of the 1D antenna arrays are arranged along the x-axis and the antenna elements of a third of the 1D antenna arrays are arranged along the y-axis in said $(x, y, z)$-coordinate system; and determine the position of the wireless device by combining the angle-of-arrival values from the three 1D antenna arrays and wherein the determining involves the solving of a nonlinear system of equations defined as:

$$r_x = \frac{x_2 \tan\theta_2 - x_1 \tan\theta_1}{\tan\theta_2 - \tan\theta_1},$$
$$r_y = \sqrt{(r_x - x_3)^2 + (r_x - x_1)^2 \tan^2\theta_1} \cos^2\theta_3,$$
$$r_z = \pm\sqrt{(r_x - x_1)^2 \tan^2\theta_1 - r_y^2},$$

wherein $(r_x, r_y, r_z)$ is the position of the wireless device, and $\theta_1$, $\theta_2$ and $\theta_3$ are the estimated angle-of-arrival values of the three 1D antenna arrays; and wherein a network node is collocated with at least one of the 1D antenna arrays.

9. The network node according to claim 8, wherein each of the estimated angle-of-arrival values defines a half-apex angle of a respective cone, where each cone has its apex centred at a respective one of the 1D antenna arrays, and wherein processing circuitry configured to cause the network node to determine the position of the wireless device comprises processing circuitry configured to cause the network node to identify a position where all the cones intersect.

10. The network node according to claim 9, wherein the line along which the antenna elements of one of the 1D antenna arrays are arranged defines a symmetry axis for said one of the 1D antenna arrays, and wherein half of an apex angle of the symmetry axis defines the cone for said one of the 1D antenna arrays.

11. The network node according to claim 10, wherein processing circuitry configured to cause the network node to determine the position of the wireless device comprises, for at least one of the 1D antenna arrays, processing circuitry configured to cause the network node to determine an angle around the symmetry axis and to determine a distance between the wireless device and said at least one of the 1D antenna arrays.

12. The network node according to claim 9, wherein processing circuitry configured to cause the network node to determine the position of the wireless device comprises, for at least one of the 1D antenna arrays, processing circuitry configured to cause the network node to determine an angle around the symmetry axis and to determine a distance between the wireless device and said at least one of the 1D antenna arrays.

13. The network node according to claim 9, wherein there are two positions at which all the cones intersect, and wherein the position of the wireless device is determined by selecting one of the two positions.

14. The network node according to claim 13, wherein each of the two positions is associated with a respective probability value for being the position of the wireless device, and wherein the position with highest probability value is selected.

15. A computer program product comprising a computer readable storage medium on which a computer program is stored and which computer program is for position determination of a wireless device and comprises computer code which, when run on processing circuitry of a network node, causes the network node to:

estimate a respective angle-of-arrival value for each of three 1D antenna arrays at positions (x_1, 0, 0), (x_2, 0, 0), and (x_3, 0, 0) in an (x, y, z)-coordinate system, from measured phase differences between antenna elements per 1D antenna array for a signal communicated between the wireless device and the three 1D antenna arrays, wherein the antenna elements of a first and a second of the 1D antenna arrays are arranged along the x-axis and the antenna elements of a third of the 1D antenna arrays are arranged along the y-axis in said (x, y, z)-coordinate system; and determine the position of the wireless device by combining the angle-of-arrival values from the three 1D antenna arrays and wherein the determining involves the solving of a nonlinear system of equations defined as:

$$r_x = \frac{x_2 \tan\theta_2 - x_1 \tan\theta_1}{\tan\theta_2 - \tan\theta_1},$$

$$r_y = \sqrt{(r_x - x_3)^2 + (r_x - x_1)^2 \tan^2\theta_1 \cos^2\theta_3},$$

$$r_z = \pm\sqrt{(r_x - x_1)^2 \tan^2\theta_1 - r_y^2},$$

wherein $(r_x, r_y, r_z)$ is the position of the wireless device, and $\theta_1$, $\theta_2$ and $\theta_3$ are the estimated angle-of-arrival values of the three 1D antenna arrays;

wherein the network node is collocated with at least one of the 1D antenna arrays.

\* \* \* \* \*